UNITED STATES PATENT OFFICE.

CHARLES E. BRITTAIN, JOSEPH ROLLEY, AND WILLIAM McGEORGE, OF SPRINGVILLE, CALIFORNIA.

REMEDY FOR THE CURE OF SCAB IN SHEEP.

SPECIFICATION forming part of Letters Patent No. 247,479, dated September 27, 1881.

Application filed October 27, 1879.

*To all whom it may concern:*

Be it known that we, CHARLES E. BRITTAIN, JOSEPH ROLLEY, and WILLIAM MCGEORGE, of Springville, in the county of Humboldt and State of California, have discovered a Remedy for the Cure of Scab in Sheep; and we do hereby declare the following is a full and exact description of the said discovery and of the ingredients composing the same and the proportions thereof—say in the proportion of one pound of lard, one pound of rosin, two ounces of spirits of turpentine, one ounce of red precipitate, two drams of quicksilver, two drams of oil of smoke, two ounces of borax, mixed into an ointment.

The ointment is applied as follows: Make an incision in the skin on the top of the shoulder of sufficient size to receive as much of the ointment as will lie in the bowl of a teaspoon. Place the ointment therein and close the incision. No further care is necessary, except repeating the operation in ten days after the first. The best time for applying the treatment is at the time of shearing.

What we claim, and desire to secure by Letters Patent, is—

The ointment or remedy for scab in sheep before described, consisting of lard, rosin, spirits of turpentine, red precipitate, quicksilver, oil of smoke, and borax, in the proportions set forth.

CHARLES E. BRITTAIN.
JOSEPH ROLLEY.
WILLIAM McGEORGE.

Witnesses:
J. E. WYMAN,
J. M. MELENDY.